United States Patent [19]
Morishige et al.

[11] Patent Number: 5,930,401
[45] Date of Patent: *Jul. 27, 1999

[54] SHADE GRADATION CORRECTION METHOD AND APPARATUS

[75] Inventors: Tadashi Morishige; Tadashi Yokouchi; Toshiya Akiba, all of Kanagawa; Sakae Okazaki, Tokyo; Toshiyuki Iijima, Tokyo; Kazumasa Miyazaki, Tokyo; Kayo Ishii, Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,764

[22] Filed: May 15, 1996

[30] Foreign Application Priority Data

May 25, 1995 [JP] Japan .................................... 7-150946

[51] Int. Cl.⁶ ...................................................... H04N 1/60
[52] U.S. Cl. ............................ 382/274; 358/516; 358/519
[58] Field of Search ..................................... 382/167, 274; 358/516–519, 521, 523–524, 461–462, 464; H04N 1/60

[56] References Cited

U.S. PATENT DOCUMENTS

| | | | |
|---|---|---|---|
| 5,038,225 | 8/1991 | Maeshima ................................ | 358/461 |
| 5,206,501 | 4/1993 | Sakakibara et al. ..................... | 358/461 |
| 5,260,809 | 11/1993 | Tachikawa ................................ | 358/461 |
| 5,572,337 | 11/1996 | Kajitani et al. .......................... | 358/464 |
| 5,594,558 | 1/1997 | Usami et al. ............................. | 358/520 |
| 5,644,409 | 7/1997 | Irie et al. .................................. | 358/461 |
| 5,661,575 | 8/1997 | Yamashita et al. ...................... | 358/523 |

*Primary Examiner*—Kim Yen Vu
*Attorney, Agent, or Firm*—Ronald P. Kananen; Rader, Fishman & Grauer

[57] ABSTRACT

A detecting unit generates defference data between optical black level of digital input data and a predetermined black level and generates γ characteristics selection signal. An offset signal obtained from the difference is added to the input data by an adding circuit. A γ characteristics setting unit is supplied with the difference data and the output signal of the adding circuit and outputs a signal in which a white level, black level and γ characteristics are corrected.

13 Claims, 2 Drawing Sheets

SHADE GRADATION CORRECTION METHOD AND APPARATUS

BACKGROUND OF THE INVENTION

1. Field of the Invention

The present invention relates to the image correcting apparatus. More particularly, it relates to the apparatus for correcting a white level and a black level of input data fetched through a scanner device based on an optical reference signal.

2. Description of the Prior Art

A scanner device is known that fetches character data and image data, and can display that data onto a monitor such as CRT display, LCD or the like. Such a scanner device is required to correct the white level, the black level and γ characteristics. In the prior art as described in Provisional Publication No. 070,275/1994, it is known that a memory is provided to storage a plurality of correcting data for the γ characteristics and the optimum γ characteristics are selected adaptively to a luminance level of an input signal.

Another type of scanner device (not publicly known technique) that uses a CCD line sensor, detects an optical black reference level by the CCD line sensor and then corrects the black level by using the optical black reference level in the manner of digital process is proposed. However, an apparatus or a method which can correct the black level, the white level and the γ characteristics of digital input data by a simple construction is still not proposed.

Moreover, a light amount correction, a color temperature correction, and a black level correction of a light source regarding input data are executed in different blocks. Since the respective corrections are executed in the different blocks as mentioned above, each block needs an exclusive-use hardware. For this purpose, for example, it is considered that the above-mentioned correcting processes are executed by one CPU (Central Processing Unit). In this case, however, a calculation amount of the contents of processes of the CPU becomes enormous.

OBJECTS AND SUMMARY OF THE INVENTION

It is, therefore, an object of the invention to provide an image correcting apparatus in which corrections of the white level, the black level and the γ characteristics of input data fetched by using a scanner device or the like can be realized by a simple construction.

Another object of the invention is to provide an image correcting apparatus in which corrections of the white level, the black level and the white balance of input data can be realized by a simple circuit of a small scale.

According to an example of the invention, there is provided an image correcting apparatus comprising: detecting unit for detecting difference data between an optical black level of fetched data and a predetermined black level and for detecting a predetermined white level; adding unit for adding an offset signal obtained on the basis of the difference data and the data; and γ characteristics setting unit to which a γ characteristics selection signal obtained on the basis of the white level and an output signal of the adding unit are supplied, wherein the γ characteristics setting unit has a plurality of γ characteristics and sets the γ characteristics so as to set components of the data to a same level.

The fetched data is supplied to the adding unit and detecting unit. In the detecting unit, an address offset signal is obtained from the difference data between the optical black level of the input data and the black level of the system and the γ characteristics selection signal is obtained on the basis of the white level. The address offset signal is supplied to the adding unit and the γ characteristics selection signal is supplied to the γ characteristics setting unit. The data added with the address offset signal is supplied from the adding unit to the γ characteristics setting unit. In the γ characteristics setting unit, optimum γ characteristics are given to the data supplied from the adding unit on the basis of the γ characteristics selection signal.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
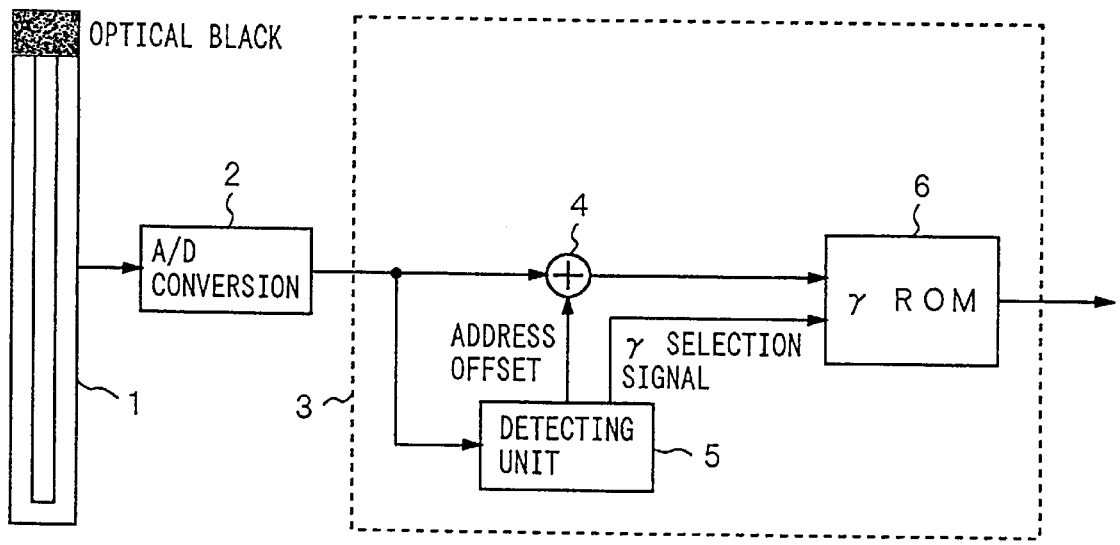
FIG. 1 is a block diagram of an image correcting apparatus according to the invention.

A construction when an image correcting apparatus according to the invention is applied to a scanner device will now be described hereinbelow with reference to the drawings. FIG. 1 is a block diagram of a scanner device. A CCD image pickup device 1 is, for example, a line CCD. Character data or image data which was photoelectrically converted by the CCD image pickup device 1 is converted to digital data by an A/D converter 2. Output digital data of the A/D converter 2 is supplied to an adder 4 and a detecting unit 5 of a signal processing unit 3. When the data is fetched, an optical black level of the CCD image pickup device 1 and a white level of a white reference plate provided for an optical system are read out by the detecting unit 5. The reading operation is individually executed every component (R signal, G, signal, and B signal) of the data.

In the detecting unit 5, an address offset signal (signal for adjusting the black level of the output data) is derived from a difference between the optical black level of the data supplied from the A/D converter 2 and a black level set in the whole system of the image correcting apparatus. The address offset signal is supplied to the adder 4. In the adder 4, the address offset signal from the detecting unit 5 is added to the data from the A/D converter 2. An output of the adder 4 is supplied to a γ ROM 6 as an address. In the detecting unit 5, a γ selection signal for selecting an optimum one of a plurality of γ curves prepared in the γ ROM 6 is formed on the basis of the detected optical white level and is supplied to the γ ROM 6. The address offset signal and γ selection signal are supplied for the respective components (R signal, G signal, and B signal) of the data. In this instance, a correction of a white balance is also simultaneously executed.

When the address offset signal and the γ curve are set for each of the R signal, G signal, and B signal, a data fetching is started by the CCD image pickup device 1. In the case where the R signal, G signal, and B signal are fetched not line sequentially but point sequentially, the address offset signal and the γ curve are switched in correspondence to each fetched pixel. A corrected signal in which the white level, black level, and white balance are corrected is outputted from the γ ROM 6 to a circuit (for example, a television monitor) at the post stage.

Figure 2:
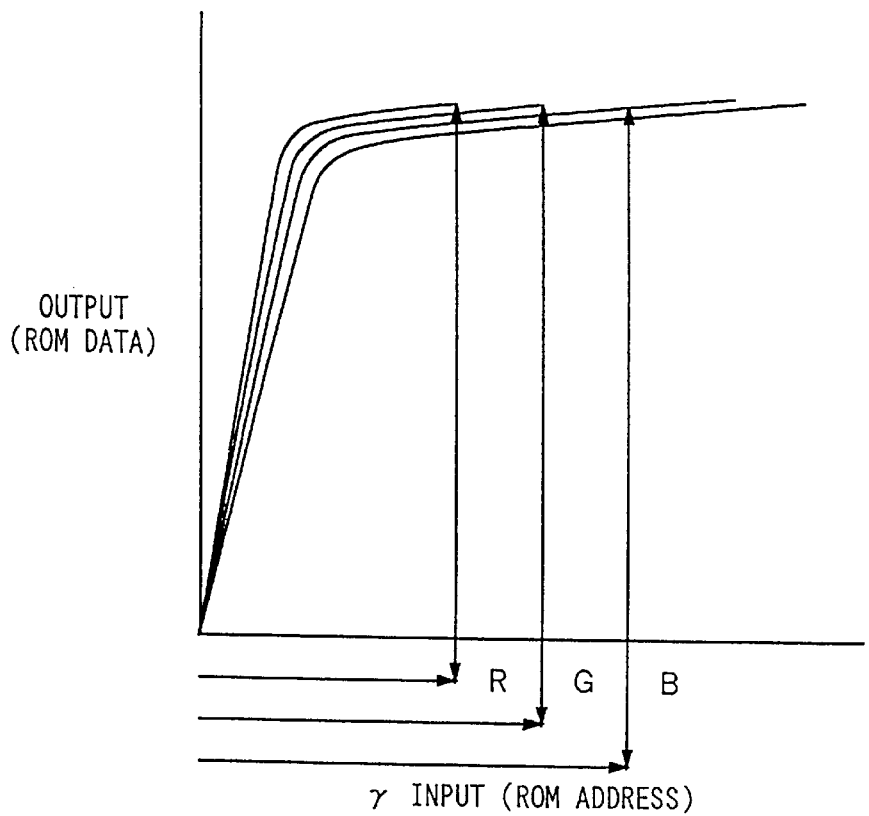
FIG. 2 is a graph of γ curves set in a γ ROM.

FIG. 2 is a graph of γ curves showing the relations between the γ selection signal (axis of abscissa) and the data that is outputted from the γ ROM 6 (axis of ordinate). As mentioned above, the γ selection signal outputted from the detecting unit 5 is a signal generated on the basis of the optical white level. As will be understood from FIG. 2, the γ curve such that the components of the data, namely, the R signal, G signal, and B signal become the same output are selected on the basis of the γ selection signal. The γ curves selected in correspondence to the respective signals are used. Thus, the light amount correction and the white balance correction can be simultaneously executed.

Figure 3:
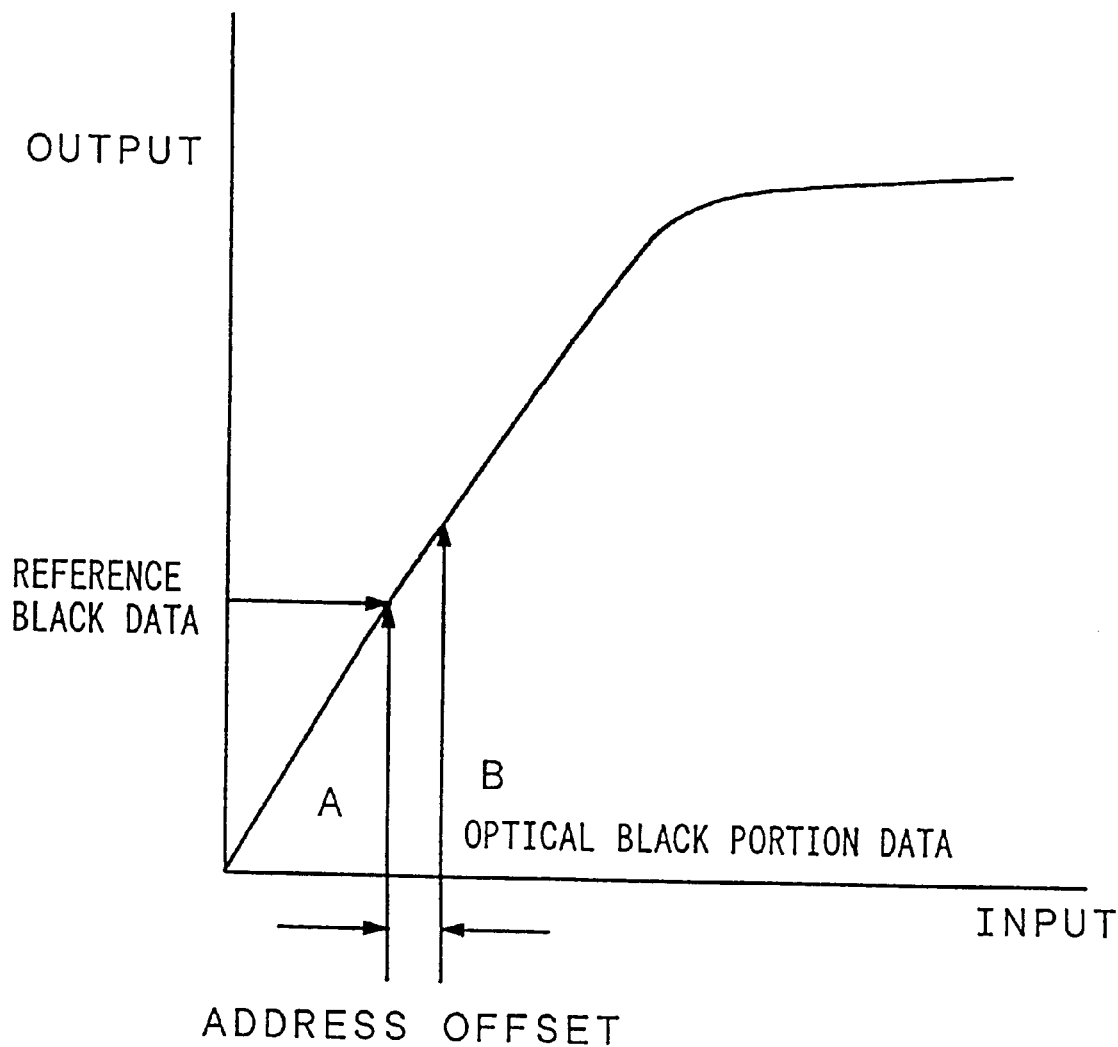
FIG. 3 is a graph showing a relation between a ROM address and output data.

FIG. 3 is a diagram showing the relation between the address outputted from the adder 4 (axis of abscissa) and the black level data (axis of ordinate) outputted from the γ ROM 6. When the address offset signal is not given, black data is outputted from the γ ROM 6 as shown B in the diagram. On the other hand, when the address offset signal is added to the input data so that the black level data that is outputted from the γ ROM 6 becomes the reference black data set by the whole system of the image correcting apparatus as shown A. That is, the difference between the black data corresponding to the input (optical black portion data) and the black data corresponding to the reference black data is outputted to the adder 4 as the offset signal.

Although the signal processing unit has been constructed by a hardware in the above-mentioned image correcting apparatus, similar processes can be also executed by a software. In this case, with respect to the address offset signal, for example, it can be realized by changing a relative value of a relative addressing.

According to the invention, by providing a plurality of γ characteristics to the γ ROM, the light amount, white balance, and black level of the data can be corrected by the switching of the γ characteristics and the setting of the address offset. Consequently, the circuit can be simply constructed. The γ correction of the data which is outputted to the monitor can be also simultaneously executed. Further, with respect to the processes of the data to be fetched, since it is sufficient to merely refer to the γ ROM and the processes can be executed at a high speed, the data fetching time can be also reduced.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An image correcting apparatus comprising:

detecting means for generating difference data by comparing a predetermined black level with an optical black level of digital input data which is obtained by A/D converting an output signal of an image pickup device, and for detecting an optical white level and generating a γ characteristics selection signal on the basis of said white level, irrespective of said black level;

adding means for adding an offset signal obtained on the basis of said difference data to said input data; and γ characteristics setting means to which said γ characteristics selection signal and an output signal of said adding means are supplied, wherein a corrected output signal in which a white level, a black level and γ characteristics are corrected is output by said γ characteristics setting means;

wherein said γ characteristics setting means has a plurality of γ characteristics and separately corrects each of a plurality of color components of the input data;

wherein said color components are an R signal, a G signal, and a B signal; and wherein said γ characteristics are selected so that the R signal, G signal, and B signal of the input data become equal to a reference white level respectively.

2. An image correcting apparatus according to claim 1, wherein said image pickup device comprises a CCD line sensor.

3. An image correcting apparatus according to claim 1, wherein said image correcting apparatus is included in a portion of a scanner device.

4. An image correcting apparatus comprising:

detecting means for generating difference data by comparing a predetermined black level with an optical black level of digital input data which is obtained by A/D converting an output signal of an image pickup device, and for detecting an optical white level and generating a γ characteristics selection signal on the basis of said white level, irrespective of said black level;

adding means for adding an offset signal obtained on the basis of said difference data to said input data; and γ characteristics setting means to which said γ characteristics selection signal and an output signal of said adding means are supplied, wherein a corrected output signal in which a white level, a black level and γ characteristics are corrected is output by said γ characteristics setting means;

wherein said γ characteristics setting means has a plurality of γ characteristics and separately corrects each of a plurality of color components of the input data.

5. An image correcting apparatus according to claim 4, wherein said color components are R signal, G signal, and B signal.

6. An image correcting apparatus according to claim 5, wherein said γ characteristics are selected so that the R signal, G signal, and B signal of the input data become equal to a reference white level respectively.

7. An image correcting apparatus according to claim 4, wherein said image pickup device comprises a CCD line sensor.

8. An image correcting apparatus according to claim 7, wherein said image correcting apparatus is included in a portion of a scanner device.

9. A method for correcting image data comprising the steps of:

A) detecting an optical black level signal, an optical white level signal and an output signal of an image pick up device, B) generating a difference data value by comparing said optical black level signal and said output signal, irrespective of said white level, C) generating a γ selection signal value for each color component of said image data output by said image pickup device by utilizing said white level signal, irrespective of said black level, D) joining said difference data value and said γ selection signal values to generate a corrected output signal, wherein said joining is performed with respect to each color component of said image data so as to separately correct each of said color components of said image data.

10. A method for correcting image data according to claim 9, wherein said color components of said image data comprise an R signal, a G signal, and a B signal.

11. A method for correcting image data according to claim 10, wherein said generating a γ selection signal value for each color component of said image data further comprises generating a γ selection signal value for each color component of said image data such that the R signal, G signal, and B signal of the input data become equal to a reference white level respectively following said step of joining.

12. A method for correcting image data according to claim 9, wherein said method further comprises receiving said output signal of said image pick up device from a CCD line sensor of said image pickup device.

13. A method for correcting image data according to claim 9, wherein said method further comprises using said image pick up device in a scanner device to generate said output signal of said image pick up device.

\* \* \* \* \*

UNITED STATES PATENT AND TRADEMARK OFFICE
CERTIFICATE OF CORRECTION

PATENT NO. : 5,930,401
DATED : July 27, 1999
INVENTOR(S) : YOKOYUCHI et al.

It is certified that error appears in the above-identified patent and that said Letters Patent is hereby corrected as shown below:

Column 4, line 35 et seq., claim 5, line 1, should read as follows;

5. An image correcting apparatus according to claim 4, wherein said color components are an R signal, G signal, and B signal.

Signed and Sealed this

Third Day of April, 2001

Attest:

NICHOLAS P. GODICI

Attesting Officer

Acting Director of the United States Patent and Trademark Office